US010937038B2

(12) United States Patent
Dintenfass et al.

(10) Patent No.: US 10,937,038 B2
(45) Date of Patent: Mar. 2, 2021

(54) NAVIGATION SYSTEM FOR MANAGING UTILIZATION OF RESOURCES

(71) Applicant: BANK OF AMERICA CORPORATION, Charlotte, NC (US)

(72) Inventors: Katherine Dintenfass, Lincoln, RI (US); Leslie Jaye Lochman, Charlotte, NC (US); Amy Elizabeth Magazu, West Deptford, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 110 days.

(21) Appl. No.: 16/267,745

(22) Filed: Feb. 5, 2019

(65) Prior Publication Data

US 2020/0252347 A1 Aug. 6, 2020

(51) Int. Cl.
*H04L 12/24* (2006.01)
*G06Q 30/02* (2012.01)
*G06Q 30/06* (2012.01)
*G06Q 30/00* (2012.01)
*H04L 12/911* (2013.01)

(52) U.S. Cl.
CPC ........... *G06Q 30/02* (2013.01); *G06Q 30/016* (2013.01); *G06Q 30/0202* (2013.01); *G06Q 30/0255* (2013.01); *G06Q 30/0631* (2013.01); *H04L 41/22* (2013.01); *H04L 47/821* (2013.01)

(58) Field of Classification Search
CPC .. G06Q 30/016; G06Q 30/02; G06Q 30/0202; G06Q 30/0255; G06Q 30/0631; G06Q 20/047; G06Q 20/105; G06Q 20/204; G06Q 40/00; G06Q 40/04; H04L 41/22; H04L 47/821; H04L 67/22; G06F 15/76; G06F 16/904; G06F 11/3495; H04N 1/00198; H04W 4/029
See application file for complete search history.

(56) References Cited

U.S. PATENT DOCUMENTS

| | | |
|---|---|---|
| 6,236,975 B1 | 5/2001 | Boe et al. |
| 7,020,626 B1 | 3/2006 | Eng et al. |
| 7,330,850 B1 | 2/2008 | Seibel et al. |
| 7,349,881 B1 | 3/2008 | Lockwood |
| 7,398,236 B2 | 7/2008 | Jaffe |

(Continued)

OTHER PUBLICATIONS http://theconversation.com/when-ai-meets-your-shopping-experience-it-knows-what-you-buy-and-what-you-ought-to-buy-101737.
https://www.orpheus-it.com/big-data/artificial-intelligence-in-procurement.

*Primary Examiner* — Le H Luu
(74) *Attorney, Agent, or Firm* — Michael A. Springs; Moore & Van Allen PLLC; Nicholas C. Russell

(57) ABSTRACT

Embodiments of the present invention provide a system for facilitating navigation of utilization of resources. The system is configured for identifying one or more priorities or one or more events associated with a user, generating one or more routes associated with at least one of the one or more priorities and the one or more events, transmitting the one or more routes to a user device of the user, transmitting first set of control signals to the user device to prompt the user to select at least one route of the one or more routes, receiving the at least one route from the user device, and transmitting a second set of control signals to the user device to transform the graphical user interface of the user device to display the at least one route and one or more graphics associated with the at least one route.

20 Claims, 5 Drawing Sheets

(56) References Cited

U.S. PATENT DOCUMENTS

| | | |
|---|---|---|
| 7,447,656 B2 | 11/2008 | Parthasarathy |
| 7,447,659 B2 | 11/2008 | Parthasarathy |
| 7,689,507 B2 | 3/2010 | Hung et al. |
| 7,734,641 B2 | 6/2010 | Kanigsberg et al. |
| 7,752,102 B2 | 7/2010 | Thomas |
| 7,792,697 B2 | 9/2010 | Bhagchandani et al. |
| 7,797,208 B2 | 9/2010 | Thomas |
| 7,873,569 B1 | 1/2011 | Cahn |
| 8,024,213 B1 | 9/2011 | Fano et al. |
| 8,144,007 B2 | 3/2012 | Tuck et al. |
| 8,285,622 B1 | 10/2012 | Rao et al. |
| 8,301,514 B1 | 10/2012 | Vippagunta |
| 8,417,584 B2 | 4/2013 | Ross |
| 8,473,380 B2 | 6/2013 | Thomas et al. |
| 8,478,691 B2 | 7/2013 | Solomon et al. |
| 8,571,919 B2 | 10/2013 | Rane et al. |
| 8,571,975 B1 | 10/2013 | Lehman et al. |
| 8,572,072 B1 | 10/2013 | Roumeliotis |
| 8,666,836 B2 | 3/2014 | Adams |
| 8,768,838 B1 * | 7/2014 | Hoffman .......... G06Q 40/00 705/44 |
| 8,782,076 B2 | 7/2014 | Rothman et al. |
| 8,838,499 B2 | 9/2014 | Del Bene et al. |
| 9,256,876 B2 | 2/2016 | Vasant Akole et al. |
| 9,311,386 B1 | 4/2016 | Song et al. |
| 9,460,468 B2 | 10/2016 | Boberski et al. |
| 9,495,703 B1 | 11/2016 | Kaye, III |
| 9,672,283 B2 | 6/2017 | Pappas et al. |
| 9,710,821 B2 | 7/2017 | Heath |
| 9,767,182 B1 | 9/2017 | Thakur et al. |
| 9,875,491 B2 | 1/2018 | Weksler |
| 2004/0139018 A1 * | 7/2004 | Anderson .......... G06Q 20/105 705/41 |
| 2008/0033852 A1 | 2/2008 | Megdal et al. |
| 2010/0145772 A1 | 6/2010 | McCauley et al. |
| 2010/0191652 A1 * | 7/2010 | Eckert .......... G06Q 20/204 705/67 |
| 2011/0082718 A1 | 4/2011 | Ghosh et al. |
| 2011/0178848 A1 | 7/2011 | Rane et al. |
| 2012/0005053 A1 | 1/2012 | Burgess et al. |
| 2013/0054314 A1 | 2/2013 | Ross et al. |
| 2013/0311326 A1 | 11/2013 | Lucas et al. |
| 2014/0025491 A1 | 1/2014 | Nagarajan et al. |
| 2014/0095251 A1 | 4/2014 | Huovilainen |
| 2015/0356679 A1 * | 12/2015 | Schmitt .......... G06Q 40/04 705/37 |
| 2016/0071201 A1 | 3/2016 | Zhang et al. |
| 2016/0180465 A1 | 6/2016 | Deperro et al. |
| 2016/0371772 A1 | 12/2016 | Zuluaga Rueda et al. |
| 2017/0011444 A1 | 1/2017 | Greystoke et al. |
| 2017/0024813 A1 | 1/2017 | Crouspeyre et al. |
| 2017/0061535 A1 | 3/2017 | Williams |
| 2017/0140563 A1 * | 5/2017 | No .......... H04N 1/00198 |
| 2017/0193501 A1 | 7/2017 | Cole et al. |
| 2017/0308455 A1 * | 10/2017 | Ryabchun .......... G06F 11/3495 |
| 2017/0322682 A1 * | 11/2017 | Humayun .......... G06F 16/904 |
| 2018/0005323 A1 | 1/2018 | Grassadonia |
| 2018/0032995 A1 * | 2/2018 | Sadiq .......... G06Q 20/047 |
| 2018/0096313 A1 | 4/2018 | Chenard et al. |
| 2018/0144412 A1 | 5/2018 | Chenard et al. |
| 2018/0189888 A1 | 7/2018 | Deperro et al. |
| 2018/0216946 A1 * | 8/2018 | Gueye .......... H04W 4/029 |
| 2018/0218176 A1 | 8/2018 | Voorhees et al. |
| 2018/0276710 A1 | 9/2018 | Tietzen et al. |
| 2018/0341785 A1 * | 11/2018 | Barday .......... G06F 15/76 |
| 2019/0005582 A1 * | 1/2019 | Kapur .......... G06Q 40/04 |
| 2019/0052701 A1 * | 2/2019 | Rathod .......... H04L 67/22 |

* cited by examiner

NAVIGATION SYSTEM FOR MANAGING UTILIZATION OF RESOURCES

BACKGROUND

Present systems do not have the capability to facilitate navigation of utilization of resources. As such, there is a need for a navigation system for managing utilization of resources.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for creating and managing self-purgative electronic resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies one or more priorities or one or more events associated with a user, generates one or more routes associated with at least one of the one or more priorities and the one or more events, transmits the one or more routes to a user device of the user, transmits first set of control signals to the user device, wherein the first set of control signals cause a graphical user interface of the user device to prompt the user to select at least one route of the one or more routes, receives the at least one route from the user device, and in response to receiving the at least one route from the user device, transmits a second set of control signals to the user device, wherein the second set of control signals transform the graphical user interface of the user device to display the at least one route and one or more graphics associated with the at least one route.

In some embodiments, the present invention continuously monitors one or more resource pools associated with the user and updates the at least one route based on monitoring the one or more resource pools associated with the user, wherein updating the at least one route comprises transmitting a third set of control signals to the user device to transform the graphical user interface of the user device to modify the one or more graphics associated with the at least one route.

In some embodiments, the present invention identifies that the user is deviating from the at least one route based on monitoring the one or more resource pools and in response to identifying that the user is deviating from the at least one route, transmits one or more alerts associated with the deviation to the user device.

In some embodiments, the present invention generates one or more tips associated with the deviation, wherein the one or more tips may be associated with rerouting of resources in the one or more resource pools and transmits the one or more tips to the user device.

In some embodiments, the present invention generates the one or more tips based on resource interactions associated with a set of users, wherein the set of users excludes the user.

In some embodiments, the present invention generates the one or more tips by determining the set of users that have one or more matching characteristics with the user.

In some embodiments, the present invention generates the one or more routes based on resource interactions associated with a set of users, wherein the set of users excludes the user, wherein the set of users and the user have one or more matching characteristics.

In some embodiments, the present invention identifies, at a later time period, one or more new priorities or one or more new events associated with the user based on monitoring the one or more resource pools of the user and in response to identifying the one or more new priorities or the one or more new events, generates one or more new routes and transmit the one or more new routes to the user device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
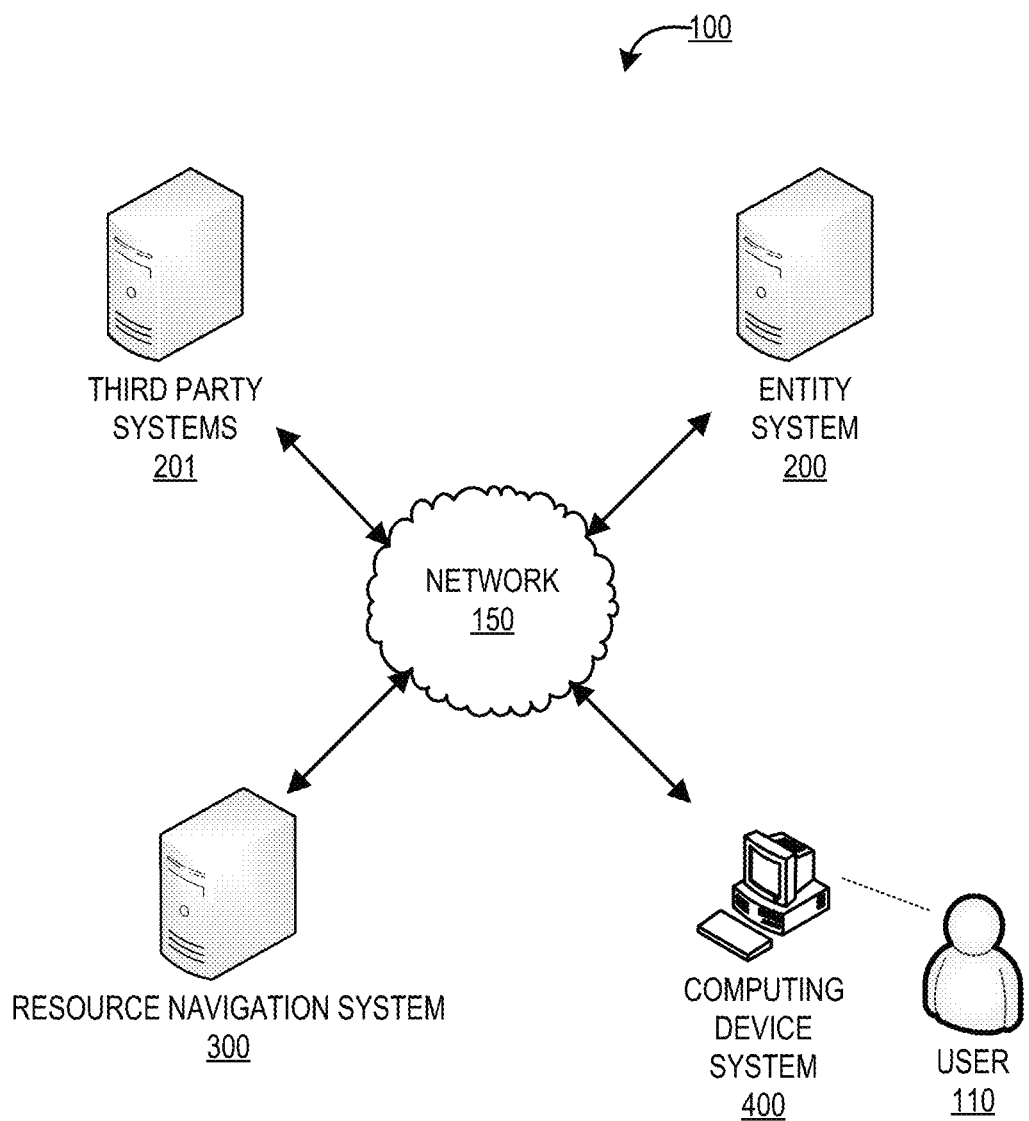
Figure 2:
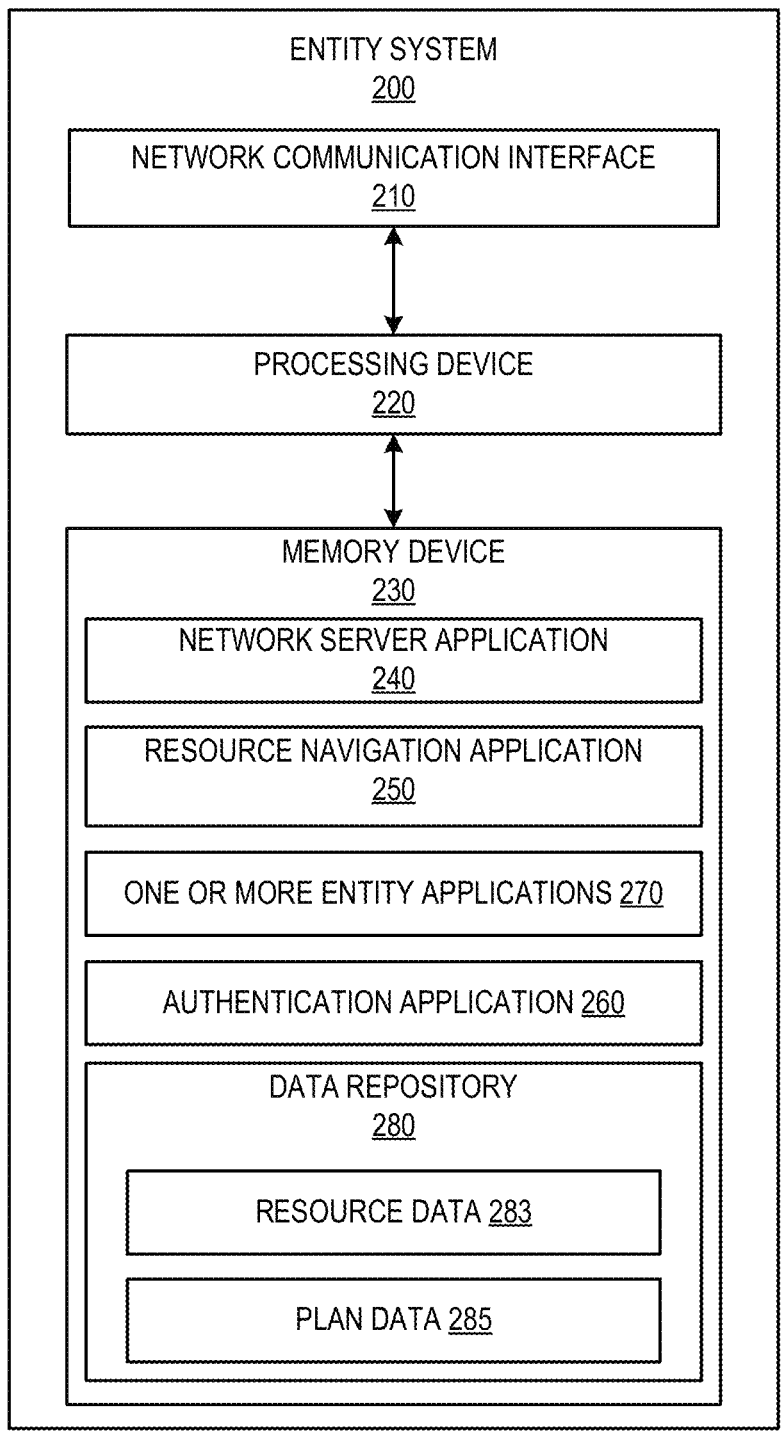
Figure 3:
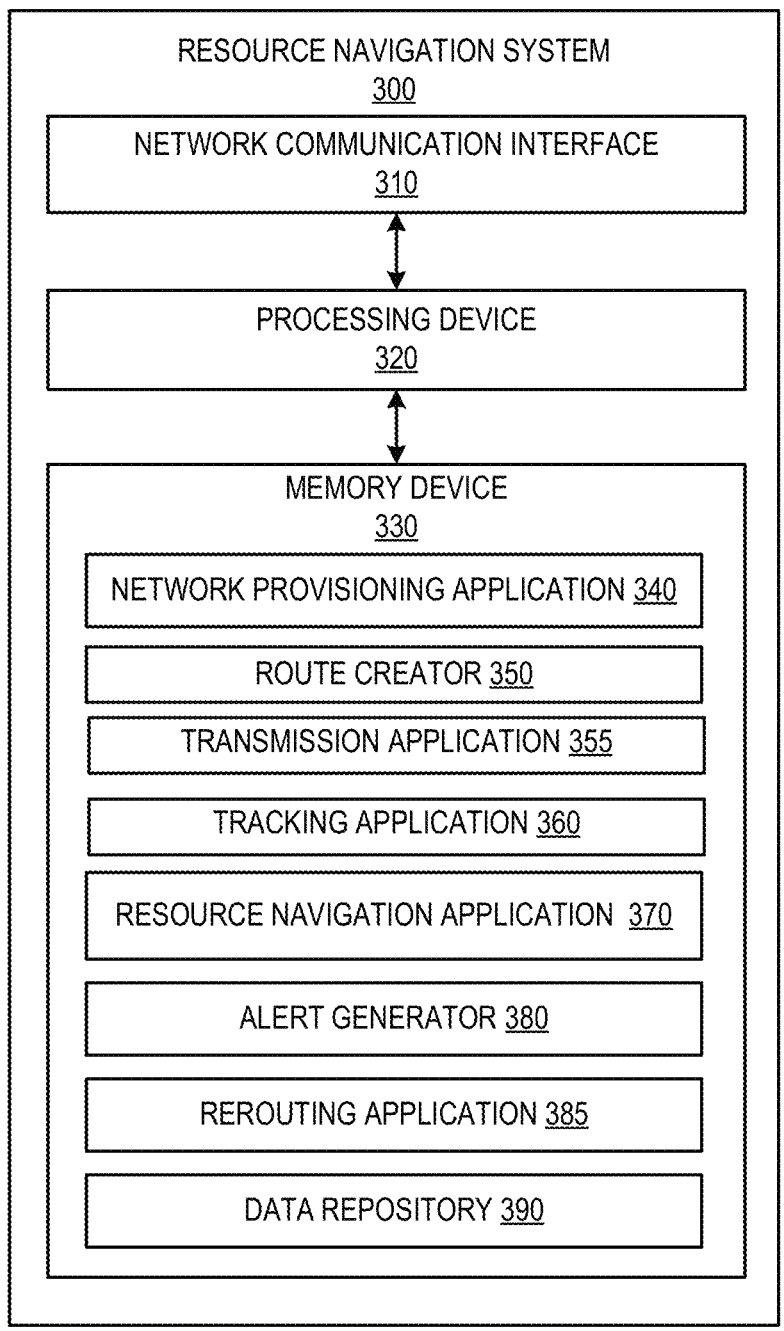
Figure 4:
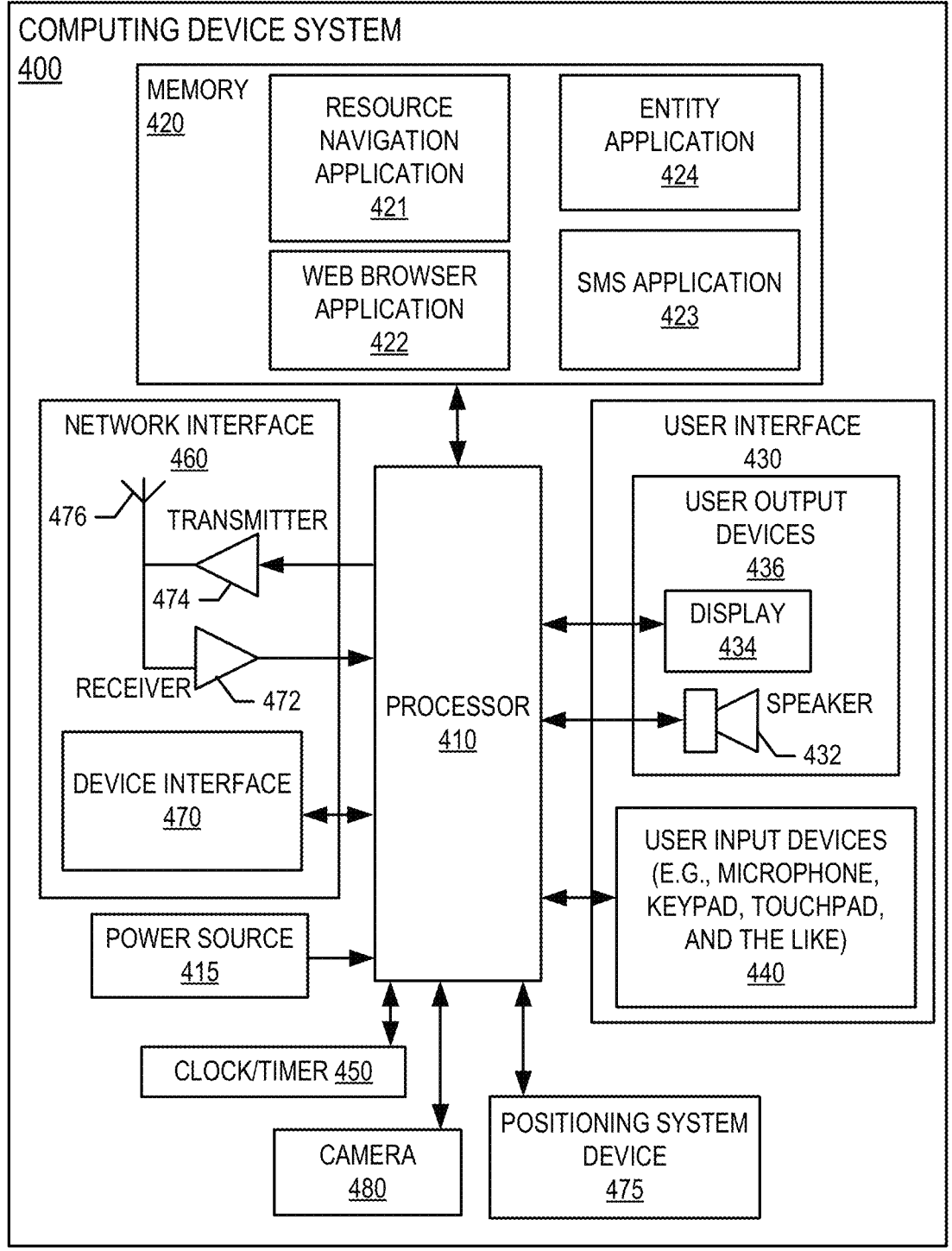
Figure 5:
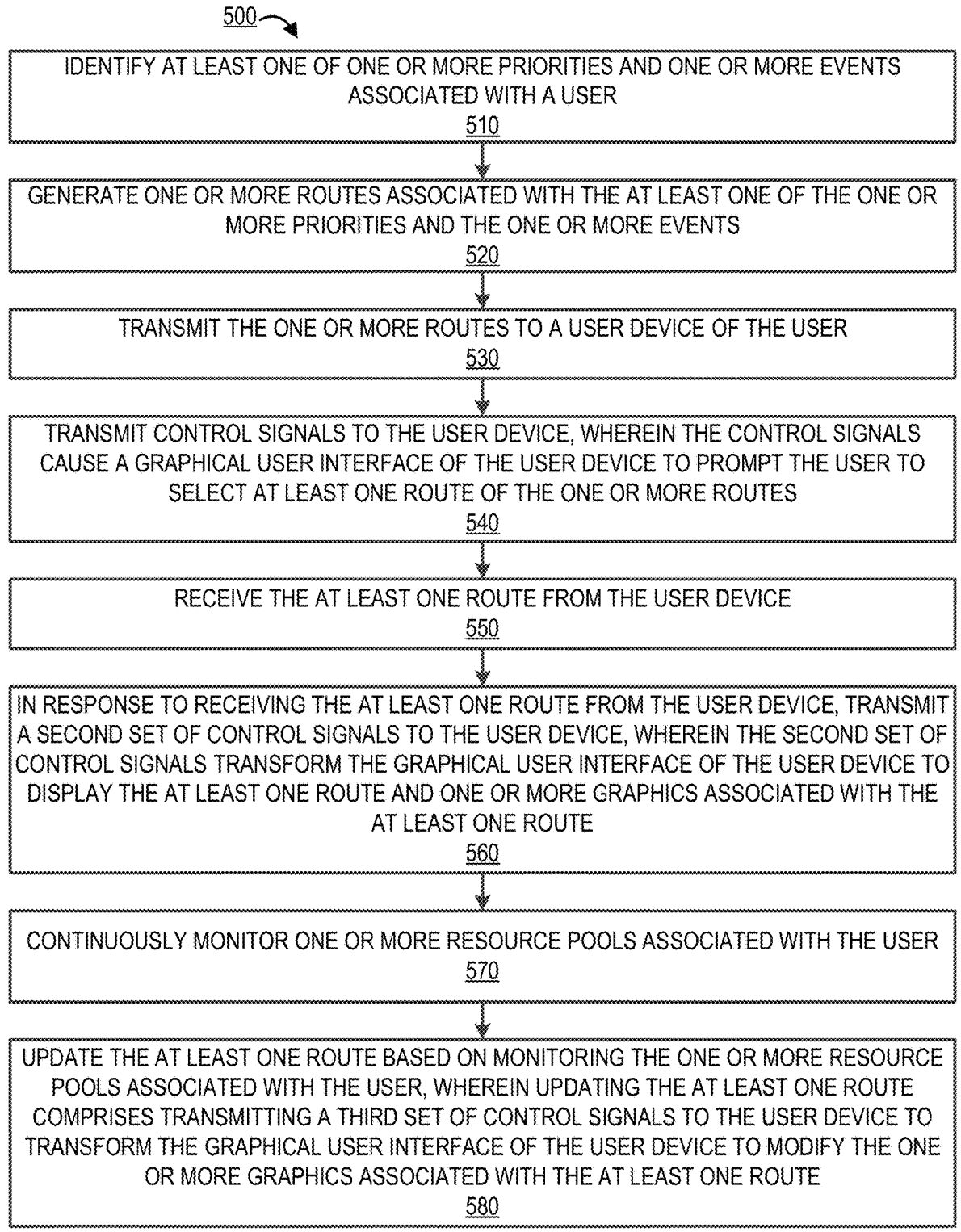

Having thus described embodiments of the invention in general terms, reference will now be made the accompanying drawings, wherein:

FIG. 1 provides a block diagram illustrating a system environment for navigating utilization of resources, in accordance with an embodiment of the invention;

FIG. 2 provides a block diagram illustrating the entity system 200 of FIG. 1, in accordance with an embodiment of the invention;

FIG. 3 provides a block diagram illustrating a resource navigation system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for navigating utilization of resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, resource management firms, insurance companies and the like. In accordance with embodiments of the invention, the terms "third party system" and "other third party systems" may include any organizations including, but not limited to, photo identification issuing agencies, network managing organizations, email managing organizations, and/or the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, a "resource pool" or an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user datafile that includes information associated with the user, or the like. The account is associated with and/or maintained by the entity.

In accordance with embodiments of the invention, a "resource interaction" may be a transaction, transfer of funds, transfer of resources, and may refer to any activities or communication between a user and an entity, between an entity and a third party system, activities or communication between multiple entities, communication between technology application and the like. Transfer of resources may refer to a payment, processing of funds, international transfer of funds, purchase of goods or services, a return of goods or services, a payment transaction, a credit transaction, or other interactions involving user's resource or account.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In accordance with embodiments of the invention, a "life plan" may include one or more life events and/or life priorities associated with a user. One or more life events may include "job change," "marriage/divorce," "welcome a child," "buy/sell home," "upcoming travel," "retirement," "end of life," and/or the like. One or more life priorities may include "Home," "Finance," "Health," "Giving," "Leisure," "Family," "Work," and/or the like.

FIG. 1 provides a block diagram illustrating a system environment 100 for navigating utilization of resources, in accordance with an embodiment of the invention. As illustrated in FIG. 1, the environment 100 includes a resource navigation system 300, entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200.

The entity system(s) 200 may be any system owned or otherwise controlled by an entity to support or perform one or more process steps described herein. The entity may be any organization which develops or manages applications. In some embodiments, the managing entity is a financial institution. In some embodiments, the managing entity is a non-financial institution.

The resource navigation system 300 is a system of the present invention for performing one or more process steps described herein. In some embodiments, the resource navigation system 300 may be an independent system. In some embodiments, the resource navigation system 300 may be a part of the entity system 200.

The resource navigation system 300, the entity system 200, the computing device system 400, and/or the third party systems 201 may be in network communication across the system environment 100 through the network 150. The resource navigation system 300 may establish multiple real-time communication channels with the entity system 200, the computing device system 400, and/or the third party systems 201. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the resource navigation system 300 is configured to communicate information or instructions with the entity system 200, the computing device system 400, and/or the third party systems 201 across the network 150.

The computing device system 400 may be a system owned or controlled by the entity of the entity system 200, the user 110, and/or a third party that specializes in processing of the resource distribution applications in the system environment 100. As such, the computing device system 400 may be a computing device of the user 110. In general, the computing device system 400 communicates with the user 110 via a user interface of the computing device system 400, and in turn is configured to communicate information or instructions with the resource navigation system 300, entity system 200, and/or the third party systems 201 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a resource navigation application 250, one or more entity applications 270, an authentication application 260, and a data repository 280 comprising resource data 283 and plan data 285. The computer-executable program code of the network server application 240, the resource navigation application 250, the one or more entity applications 270, and the authentication application 260 to perform certain logic, data-extraction, and data-storing functions of the entity system 200 described herein, as well as communication functions of the entity system 200.

The network server application 240, the resource navigation application 250, the one or more entity applications 270, and the authentication application 260 are configured to store data in the data repository 280 or to use the data stored in the data repository 280 when communicating through the network communication interface 210 with the resource navigation system 300, the computing device system 400, and/or the third party systems 201 to perform one or more process steps described herein. In some embodiments, the entity system 200 may receive instructions from the resource navigation system 300 via the resource navigation application 250 to perform certain operations. The resource navigation application 250 may be provided by the resource navigation system 300. The one or more entity applications 270 may be any of the applications used, created, modified, and/or managed by the entity system 200. The authentication application 260 may be used to authenticate one or more users 110 to access the one or more entity applications 270 and the data repository 280.

FIG. 3 provides a block diagram illustrating the resource navigation system 300 in greater detail, in accordance with embodiments of the invention. As illustrated in FIG. 3, in one embodiment of the invention, the resource navigation system 300 includes one or more processing devices 320 operatively coupled to a network communication interface 310 and a memory device 330. In certain embodiments, the resource navigation system 300 is operated by a first entity, such as a financial institution, while in other embodiments, the resource navigation system 300 is operated by an entity other than a financial institution. In some embodiments, the resource navigation system 300 is owned or operated by the entity of the entity system 200. In some embodiments, the resource navigation system 300 may be an independent system. In alternate embodiments, the resource navigation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the resource navigation system 300 described herein. For example, in one embodiment of the resource navigation system 300, the memory device 330 includes, but is not limited to, a network provisioning application 340, a route creator 350, a transmission application 355, a tracking application 360, resource navigation application 370, an alert generator, a rerouting application 385, and a data repository 390 comprising data processed or accessed by one or more applications in the memory device 330. The computer-executable program code of the network provisioning application 340, the route creator 350, transmission application 355, the tracking application 360, the resource navigation application 370, the alert generator 380, and the rerouting application 385 may instruct the processing device 320 to perform certain logic, data-processing, and data-storing functions of the resource navigation system 300 described herein, as well as communication functions of the resource navigation system 300.

The network provisioning application 340, the route creator 350, the transmission application 355, the tracking application 360, the resource navigation application 370, the alert generator 380, and the rerouting application 385 are configured to invoke or use the data in the data repository 390 when communicating through the network communication interface 310 with the entity system 200, the computing device system 400, and/or the third party systems 201. In some embodiments, the network provisioning application 340, the route creator 350, the transmission application 355, the tracking application 360, the resource navigation application 370, the alert generator 380, and the rerouting application 385 may store the data extracted or received from the entity system 200, the third party system 201, and the computing device system 400 in the data repository 390. In some embodiments, the network provisioning application 340, the route creator 350, the transmission application 355, the tracking application 360, the resource navigation application 370, the alert generator 380, and the rerouting application 385 may be a part of a single application.

The route creator 350 generates one or more routes associated with one or more life priorities and one or more life events associated with the user. In response to creating the one or more routes, the transmission application 355 transmits the one or more routes to the computing device system 400 of the user, via the resource navigation application 421 installed on the computing device system. Additionally, the route creator application 350 may transmit control signals via the transmission application 355 to the user device to prompt the user to select at least one route of the one or more routes and in response to receiving the at least one route may transmit second set of control signals to transform the user interface of the computing device system 400 to display the at least one route and the one or more graphics associated with the route. The tracking application 360 monitors the resource pools of the user and the resource navigation application 370 may navigate the user to stay on the at least one route based on monitoring the resource pools of the user. The alert generator 380 may generate one or more alerts based on identifying that the user is deviating from the at least one route. The rerouting application may automatically reroute resources of the user based on identifying that the user is deviating from the at least one route. In some embodiments, the rerouting application 385 may reroute the resources only after receiving consent from the user. Other steps performed by the network provisioning application 340, the route creator 350, the transmission application 355, the tracking application 360, the resource navigation application 370, the alert generator 380, and the rerouting application 385 are described in detail in FIG. 5 below.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, resource navigation application 421, entity application 424. These applications also typically instructions to a graphical user interface (GUI) on the display 430 that allows the user 110 to interact with the entity system 200, the resource navigation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the resource navigation application 421 provided by the resource navigation system 300 allows the user 110 to access the one or more electronic resources stored in the entity system and/or the resource navigation system 300. In some embodiments, the entity application 424 provided by the entity system 200 and the resource navigation application 421 allow the user 110 to access one or more electronic resources and one or more entity applications 270.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for facilitating navigation of utilization of resources, in accordance with an embodiment of the invention. As shown in block 510, the system identifies at least one of one or more priorities and one or more events associated with a user. The one or more priorities may comprise "Home," "Finance," "Health," "Giving," "Leisure," "Family," "Work," and/or the like. The one or more events may include nay life events such as "job change," "marriage/divorce," "welcome a child," "buy/sell home," "upcoming travel," "retirement," "end of life," and/or the like. In some embodiments, the system may identify the one or more priorities and the one or more events based monitoring the resource interactions associated with the one or resource pools of the user. For example, the system may identify that the user has recently purchased a crib and other products and may associate the user with the "welcome a child" life event. In some embodiments, the system may identify the one or more life priorities and the one or more life events based on monitoring one or more applications on the user device of the user. In such an embodiment, the system may monitor the one or more applications on the user device of the user only after receiving consent from the user. In some embodiments, the system may prompt the user periodically to identify one or more events and one or more priorities via a user interface of an entity application and based on the response received from the user, the system may identify the one or more priorities and the one or more events. In some embodiments, the system may identify the one or more priorities and the one or more events based on the conversations with an associate (e.g., customer care representative, financial analyst, or the like) of the entity.

As shown in block 520, the system generates one or more routes associated with the at least one of the one or more priorities and the one or more events. In some embodiments, the one or more routes may be associated with level of difficulty. For example, the one or more routes may be a moderate route, a safe route, an aggressive route, or the like. In some embodiments, the system may generate the one or more routes based on a set of users that are similar to the user. The system may compare the one or more characteristic of the user with all the users associated with the entity and may determine the set of users that have the same one or more characteristics as that the of the user. For example, the system may identify that the user is experiencing a life event such as marriage or is saving towards a life priority "leisure" and may identify all other users who experienced such a life event or a life priority. In some cases, the system may further filter out the identified users based on specific user characteristics. For example, the system may identify all users with a similar life history to that of the user and who experienced the same life event and/or life priority. The system after determining the set of users, extracts resource information associated with the set of users and generates one or more routes. For example, the system may identify one or more transactions associated with the set of users to design one or more routes to the user. Elaborating the example, the system may identify that 40% of the set of users performed a first set of transactions, 30% of the set of users performed a second set of transactions, and 30% of the set of users performed a third set of transactions and may create three routes, where each of the routes correspond to the first set of transactions, the second set of transactions, and the third set of transactions.

In one exemplary embodiment, the system may identify that the user is saving towards "leisure" life priority and may identify a set of users who saved towards the same life priority, where the set of users have one or more characteristics similar to the user. The system may extract transaction data associated with the set of users and may identify transactions that the set of users performed in order to successfully save towards the "leisure" life priority. The system may then generate one or more routes comprising one or more targets, where the one or more targets comprise the transactions performed by the set of users.

As shown in block 530, the system transmits the one or more routes to a user device of the user. In some embodiments, the user device is a mobile device. In some other embodiments, the user device is a user computing system. The system may transmit the one or more routes via an entity application. In some embodiments, the system may transmit the one or more routes via an application installed on the user device that is provided by the system. As shown in block 540, the system transmits control signals to the user device, wherein the control signals cause a graphical user interface of the user device to prompt the user to select at least one route of the one or more routes. As shown in block 550, the system receives the at least one route from the user device.

As shown in block 560, the system in response to receiving the at least one route from the user device transmits a second set of control signals to the user device, wherein the second set of control signals transform the graphical user interface of the user device to display the at least one route and one or more graphics associated with the at least one route. The control signals transform the graphical user interface of the user device to display the one or more routes and one or more graphics for multiple targets to be achieved, current progress, or the like. For example, if the at least one route is associated with "welcome a child" life event, the system may display one or more graphics associated with checklists including, but not limited to, opening a child savings account, setting up a recurring deposit to the child savings account, make an investment, transferring funds to the child savings account, buying a crib, buying baby supplies, updating insurance, and the like in the form of path or a route with each of the items in the checklist as a milestone. The transmitted control signals may transform the graphical user interface using any of the available visualization techniques.

As shown in block 570, the system continuously monitors one or more resource pools associated with the user. The system after displaying the at least one route with one or more graphics to the user, continuously monitors one or more resource pools associated with the user to identify the progress of the user on the at least one route. In some embodiments, the system may identify monitor one or more applications on the user device of the user. For example, the system may monitor email application to identify one or more receipts associated with the one or more priorities or one or more events.

Furthermore, the system may provide follow on reminder or recommendation actions, such as specific next steps in the process on the route based on the monitoring and real time adjustment of the user on the route. In this way, the system may provide next step actions for the user even if the user has deviated from the original route.

As shown in block 580, the system updates the at least one route based on monitoring the one or more resource pools associated with the user, wherein updating the at least one route comprises transmitting a third set of control signals to the user device to transform the graphical user interface of the user device to modify the one or more graphics associated with the at least one route. Continuing with the previous example, where the at least one route is associated with "welcome a child" life event, the system may identify that the user set up the child savings account and may update the progress of the user on the at least one route. Updating the progress may include moving a marker associated with the at least one route to the next item on the checklist. Additionally, in some embodiments, the system may transform the graphical user interface to display only the next item on the checklist until it is completed by the user.

In some embodiments, the system may monitor the resource pools of the user to identify that the user is deviating from the at least one route. Continuing with the previous example, where the at least one route is associated with "welcome a child" life event, the system may identify that a transaction corresponding to a purchase exceeding $500, where the purchase is not part of the checklist. The system in response to identifying that the use ruse is deviating from the at least one route, generates alerts and transmits the alerts to the user device. In some embodiments, the system may transmit alerts in the form of a text message. In some embodiments, the system may transmit alerts in the form of a prompt in the entity application (e.g., online banking application). In some embodiments, the system may transmit alerts via the entity application only after identifying that the user is using the entity application.

In some embodiments, the system may generate tips or suggestions for navigating the user through the at least one route. For example, the system may identify that the user is spending more on coffee and generate a suggestion to spend less on coffee. In some embodiments, the system may present one or more facts associated with the generated one or more tips or suggestions. For example, the system may present a fact associated with consumption of coffee and health concerns. In some embodiments, the one or more facts may be on the user data. For example, the system may generate a fact that other users having the same characteristics of the user spend $80 on an average every month on coffee.

In some embodiments, the system may identify, at a later time period, one or more new priorities or one or more new events associated with the user based on monitoring the one or more resource pools of the user. In response to identifying the one or more new priorities or the one or more new events, the system may generate one or more new routes and transmit the one or more new routes to the user device. In some embodiments, the system may update the existing at least one route to incorporate additional sub-routes associated with the one or more new priorities or the one or more new events.

In some embodiments, the system may provide a link to an expert or specialist for the priority of the user. As such, the expert or specialist may be able to provide the user with additional information about a best time to purchase the products associated with the priority, additional products or add-on products or services necessary for the priority, and the like. The expert or specialist may be digitally provided or be an individual that contacts the user.

In some embodiments, the system may trigger responses to the user to meeting locations along the route and successfully reaching points along the route. These triggered responses may include rewards or the like associated with hitting one or more locations and/or milestones along the route process towards priority achievement.

In some embodiments, the system may also identify individuals on the same or similar route as the user. In some embodiments, these individuals may also be in the same geolocation, duration of life, or the like as the user. The system may compare the user to the individual and provide the user with a peer comparison for route matching and priority achievement.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. Patent Application Ser. No. | Title | Filed On |
| --- | --- | --- |
| 16/267,518 | SYSTEM FOR ASSESSING AND PRIORITIZING REAL TIME RESOUCE REQUIREMENTS | Feb. 5, 2019 |
| 16/267,519 | SYSTEM FOR RESOURCE REQUIREMENTS AGGREGATION AND CATEGORIZATION | Feb. 5, 2019 |
| 16/268,062 | SYSTEM FOR SMART CONTRACT DEPENDENT RESOURCE TRANSFER | Feb. 5, 2019 |
| 16/267,730 | SYSTEM FOR REAL TIME PROVISIONING OF RESOURCES BASED ON CONDITION MONITORING | Feb. 5, 2019 |

-continued

| U.S. Patent Application Ser. No. | Title | Filed On |
|---|---|---|
| 16/267,521 | SYSTEM FOR REAL-TIME TRANSMISSION OF DATA ASSOCIATED WITH TRIGGER EVENTS | Feb. 5, 2019 |

The invention claimed is:

1. A system for facilitating navigation of utilization of resources, the system comprising:
at least one transitory storage device; and
at least one processing device coupled to the at least one non-transitory storage device, wherein the at least one processing device is configured to:
identify one or more priorities or one or more events associated with a user;
generate one or more routes associated with at least one of the one or more priorities and the one or more events;
transmit the one or more routes to a user device of the user;
transmit first set of control signals to the user device, wherein the first set of control signals cause a graphical user interface of the user device to prompt the user to select at least one route of the one or more routes;
receive the at least one route from the user device; and
in response to receiving the at least one route from the user device, transmit a second set of control signals to the user device, wherein the second set of control signals transform the graphical user interface of the user device to display the at least one route and one or more graphics associated with the at least one route.

2. The system of claim 1, wherein the at least one processing device is further configured to:
continuously monitor one or more resource pools associated with the user; and
update the at least one route based on monitoring the one or more resource pools associated with the user, wherein updating the at least one route comprises transmitting a third set of control signals to the user device to transform the graphical user interface of the user device to modify the one or more graphics associated with the at least one route.

3. The system of claim 2, wherein the at least one processing device is further configured to:
identify that the user is deviating from the at least one route based on monitoring the one or more resource pools; and
in response to identifying that the user is deviating from the at least one route, transmit one or more alerts associated with the deviation to the user device.

4. The system of claim 3, wherein the at least one processing device is further configured to:
generate one or more tips associated with the deviation, wherein the one or more tips may be associated with rerouting of resources in the one or more resource pools; and
transmit the one or more tips to the user device.

5. The system of claim 4, wherein the at least one processing device is configured to generate the one or more tips based on resource interactions associated with a set of users, wherein the set of users excludes the user.

6. The system of claim 5, wherein the at least one processing device is configured to generate the one or more tips by determining the set of users that have one or more matching characteristics with the user.

7. The system of claim 2, wherein the at least one processing device is further configured to:
identify, at a later time period, one or more new priorities or one or more new events associated with the user based on monitoring the one or more resource pools of the user; and
in response to identifying the one or more new priorities or the one or more new events, generate one or more new routes and transmit the one or more new routes to the user device.

8. The system of claim 1, wherein the at least one processing device is configured to generate the one or more routes based on resource interactions associated with a set of users, wherein the set of users excludes the user, wherein the set of users and the user have one or more matching characteristics.

9. A computer program product for facilitating navigation of utilization of resources, the computer program product comprising a non-transitory computer-readable storage medium having computer executable instructions for causing a computer processor to perform the steps of:
identifying one or more priorities or one or more events associated with a user;
generating one or more routes associated with at least one of the one or more priorities and the one or more events;
transmitting the one or more routes to a user device of the user;
transmitting first set of control signals to the user device, wherein the first set of control signals cause a graphical user interface of the user device to prompt the user to select at least one route of the one or more routes;
receiving the at least one route from the user device; and
in response to receiving the at least one route from the user device, transmitting a second set of control signals to the user device, wherein the second set of control signals transform the graphical user interface of the user device to display the at least one route and one or more graphics associated with the at least one route.

10. The computer program product of claim 9, wherein the computer executable instructions further cause the computer processor to:
continuously monitor one or more resource pools associated with the user; and
update the at least one route based on monitoring the one or more resource pools associated with the user, wherein updating the at least one route comprises transmitting a third set of control signals to the user device to transform the graphical user interface of the user device to modify the one or more graphics associated with the at least one route.

11. The computer program product of claim 10, wherein the computer executable instructions further cause the computer processor to:
identify that the user is deviating from the at least one route based on monitoring the one or more resource pools; and
in response to identifying that the user is deviating from the at least one route, transmit one or more alerts associated with the deviation to the user device.

12. The computer program product of claim 11, wherein the computer executable instructions further cause the computer processor to:

generate one or more tips associated with the deviation, wherein the one or more tips may be associated with rerouting of resources in the one or more resource pools; and transmit the one or more tips to the user device.

13. The computer program product of claim 12, wherein the computer executable instructions further cause the computer processor to generate the one or more tips based on resource interactions associated with a set of users, wherein the set of users excludes the user.

14. The computer program product of claim 13, wherein the computer executable instructions further cause the computer processor to generate the one or more tips by determining the set of users that have one or more matching characteristics with the user.

15. The computer program product of claim 9, wherein the computer executable instructions further cause the computer processor to generate the one or more routes based on resource interactions associated with a set of users, wherein the set of users excludes the user, wherein the set of users and the user have one or more matching characteristics.

16. A computerized method for facilitating navigation of utilization of resources, the method comprising:
identifying one or more priorities or one or more events associated with a user;
generating one or more routes associated with at least one of the one or more priorities and the one or more events;
transmitting the one or more routes to a user device of the user;
transmitting first set of control signals to the user device, wherein the first set of control signals cause a graphical user interface of the user device to prompt the user to select at least one route of the one or more routes;
receiving the at least one route from the user device; and
in response to receiving the at least one route from the user device, transmitting a second set of control signals to the user device, wherein the second set of control signals transform the graphical user interface of the user device to display the at least one route and one or more graphics associated with the at least one route.

17. The computerized method of claim 16, wherein the method further comprises:
continuously monitoring one or more resource pools associated with the user; and
updating the at least one route based on monitoring the one or more resource pools associated with the user, wherein updating the at least one route comprises transmitting a third set of control signals to the user device to transform the graphical user interface of the user device to modify the one or more graphics associated with the at least one route.

18. The computerized method of claim 17, wherein the method further comprises:
identifying that the user is deviating from the at least one route based on monitoring the one or more resource pools; and
in response to identifying that the user is deviating from the at least one route, transmitting one or more alerts associated with the deviation to the user device.

19. The computerized method of claim 18, wherein the method further comprises:
generating one or more tips associated with the deviation, wherein the one or more tips may be associated with rerouting of resources in the one or more resource pools; and
transmitting the one or more tips to the user device.

20. The computerized method of claim 19, wherein the method further comprises generating the one or more tips based on resource interactions associated with a set of users, wherein the set of users excludes the user.

* * * * *